United States Patent [19]

Mori

[11] Patent Number: 4,459,642
[45] Date of Patent: Jul. 10, 1984

[54] OPTICAL LIGHTING DEVICE

[76] Inventor: Kei Mori, 3-16-3-501, Kaminoge, Setagaya-ku, Tokyo, Japan

[21] Appl. No.: 280,504

[22] Filed: Jul. 6, 1981

[30] Foreign Application Priority Data

Jul. 7, 1980 [JP] Japan .................................. 55-92469
Jul. 17, 1980 [JP] Japan .................................. 55-98050

[51] Int. Cl.³ .............................................. F21V 7/04
[52] U.S. Cl. ................................. 362/32; 350/96.10; 350/96.20; 350/259; 362/346; 362/347; 362/307
[58] Field of Search ................ 350/96.20, 96.10, 172, 350/258, 259, 260, 261, 262, 263, 264, 265; 362/32, 346, 347, 307

[56] References Cited

U.S. PATENT DOCUMENTS

| | | | |
|---|---|---|---|
| 3,299,306 | 1/1967 | Kapany | 350/96.15 |
| 3,491,245 | 1/1970 | Hardesty | 350/96.10 |
| 3,511,559 | 5/1970 | Foster | 350/258 |
| 3,694,945 | 10/1972 | Detiker | 350/172 |
| 4,297,000 | 10/1981 | Fries | 350/265 |

FOREIGN PATENT DOCUMENTS

1936715 8/1979 Fed. Rep. of Germany ..... 350/96.1

Primary Examiner—John D. Lee
Assistant Examiner—Frank González
Attorney, Agent, or Firm—Merchant, Gould, Smith, Edell, Welter & Schmidt

[57] ABSTRACT

An optical lighting device for diffusing beams of light rays propagating through and emitting from an optical conductor connected to a light source, comprising a semi-transparent hollow column, a first end plate which is connected to one end of the hollow column to close the same and which has a guide hole in which an outlet end of the optical conductor is fitted, and a second end plate which is connected to the other end of the hollow column to close the same.

26 Claims, 14 Drawing Figures

OPTICAL LIGHTING DEVICE

The invention relates to an optical lighting device which can effectively diffuse light rays or beams fed from a light source by means of an optical conductor such as an optical fiber.

My invention may be advantageously used, for example, for lighting the interior of human occupancies, such as rooms of a building, underwater enclosures, and so on, with natural solar beams or rays collected on the earth's surface,

BACKGROUND OF THE INVENTION

Hitherto, various attempts have been made to utilize the solar light energy reaching the earth's surface. However, most of the prior art solar energy systems involve the conversion of the captured solar light energy into electric or thermal energy and, as far as I am aware there are very few that directly utilize the solar beams themselves as a source of optical energy. In lighting applications, it is obvious that the use of solar energy in the form of optical energy is advantageous since conversion loss is obviated.

With a view to providing a solar system which employs solar radiation as a light source, I have previously developed an apparatus for collecting solar beams capable of condensing the solar beams so that they are introduced into an optical conductor, such as an optical fiber (Japanese Patent Laid-Open Publication No. 55-28055). Being reflected at the boundary surface of the optical fiber, the light rays or solar beams propagate therealong and then issue out of the optical fiber from its exit end. The angle of emission of the light rays issuing from the exit end of the optical fiber depends on the critical angle of incidence of the material forming the optical fiber and, normally, is usually not greater than about 48° for an optical fiber made from pure silicate. When the interior of a room is illuminated with light rays issuing from one or a bundle of optical fibers, illumination takes place in a spotlight-like fashion. Thus, it is not possible to illuminate a sufficiently wide area with soft or mellow light rays.

SUMMARY OF THE INVENTION

The primary object of the invention is to overcome the foregoing drawbacks by providing an optical lighting device capable of effectively diffusing beams of light rays propagating through and issuing from an end of optical fiber, so that an extended area is illuminated with soft light rays.

The invention will be discussed below in detail with reference to the accompanying drawings, in which:

DETAILED DESCRIPTION OF THE INVENTION

Figure 1:
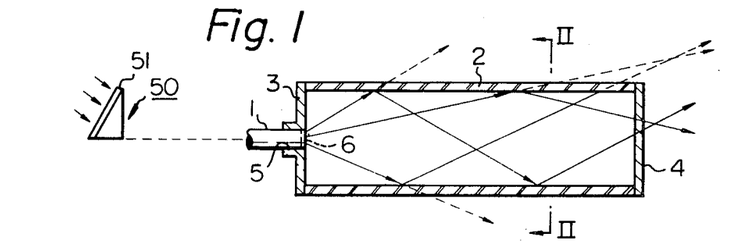
FIG. 1 is a longitudinal sectional view of a first embodiment of an optical lighting device according to the present invention.
Figure 2:
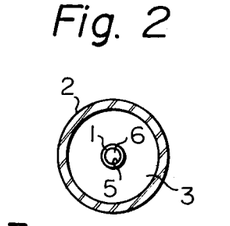
FIG. 2 is a cross sectional view taken along the line II—II in FIG. 1.

Referring now to FIGS. 1 and 2, the lighting device according to the invention includes a semi-transparent tubular column 2 which may be preferably in the form of a hollow cyllinder.

Figure 14:
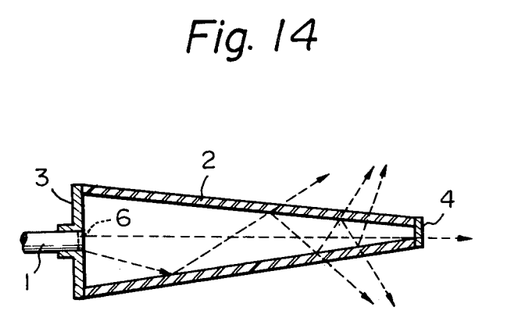
FIG. 14 is a longitudinal sectional view of still another embodiment which includes a conical column.

However, the column 2 is not limited to a cylindrical shape, but can be a polygonal tube or conical shape (FIG. 14). One end of the column 2 is closed by a first end plate 3 attached thereto and having a center guide hole 5 in which one or a bundle of optical fiber(s) 1 is inserted. The optical fiber 1 is connected to the end plate 3 so that one end (front end) of the fiber 1 opens into the column 2. Alternatively, a transparent cover 6 which transmits light can be attached to the guide hole 5 of the end plate 3. The cover 6 can be dispensed with. The other end (rear end) of the fiber 1 is connected to a conventional sunbeam collector 50 having lens means 51, so that the collected sunbeams pass through the optical fiber 1 and come to the front end of the fiber 1. Alternatively, it is also possible to connect the rear end of the fiber 1 to a light source other than the sunbeams, such as an electrical lamp. The other end of the column 2 is closed by a second end plate 4 connected thereto.

Due to the semi-transparent column 2, a part of the light rays emitted from the optical fiber 1 into the column 2 is reflected by the peripheral wall of the column 2, as shown by solid lines with arrows in FIG. 1, and the other part of the light rays passes through the peripheral wall of the column 2, as shown by dotted lines with arrows. Even when the light rays come into collision with the column 2, a part of the light rays is reflected and the remaining light rays pass through the column 2 without being reflected and are transmitted outside of the column 2. Thus, the light rays emitted into the column 2 from the optical fiber 1 are repeatedly reflected in part, so that an extended area of a room can be illuminated with soft or mellow light rays. In the embodiment illustrated in FIG. 1, the first and second end plates 3 and 4 may be either transparent or semi-transparent.

It should be noted here that the term "semi-transparent" referred to herein includes not only a diffusion layer, but also a half mirror. Furthermore, the column 2 can be wholly formed by a semi-transparent material or may be formed partly by a semi-transparent material and party by a transparent material. That is, the column 2 can be provided with a semi-transparent outer (or inner) peripheral wall and a transparent inner (or outer) peripheral wall. It is also possible to put the semi-transparent layer between outer and inner transparent walls (layers). The semi-transparent layer can be provided with fluorescent paints mixed therein so that light rays having wave-lengths longer than that of incidence light issue from the column. This means that only light rays having wave-lengths necessary for, for example, the growth of plants can be provided.

Figure 3:
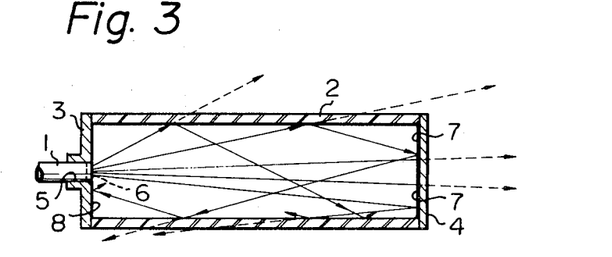
FIGS. 3, 4 and 5 are longitudinal sectional views of three different embodiments of the present invention, respectively.

In an embodiment illustrated in FIG. 3, the second end plate 4 is provided, on its inner surface, with a reflective surface layer 7. The reflective surface layer 7 may be provided on parts of, or on the whole of, the inner surface of the end plate 4. When the reflective surface layers 7 are provided on parts of the inner surface of the end plate 4, they are preferably located along the periphery of the end plate 4. In order to increase the reflectivity and/or diffusibility, the inner surface of the first end plate 3 can be of a partially or wholly reflective surface 8.

Figure 4:
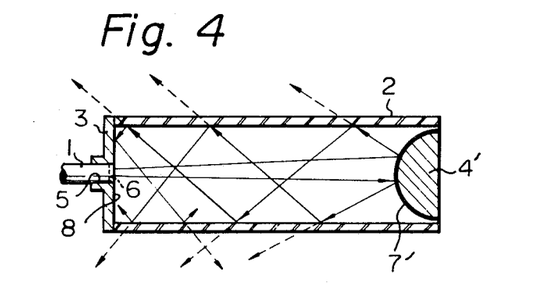

In order to further increase the reflectivity and/or diffusibility, it is possible to provide an end plate 4' which has a curved (convex or concave) reflective inner surface 7'. Such a curved reflective inner surface 7' makes it possible to provide different brightnesses of light rays, so that only light rays reflected in predetermined directions are brighter or dimmer. The first end plate 3 can also have a curved reflective inner surface similar to the surface 7'.

Figures 5, 6:
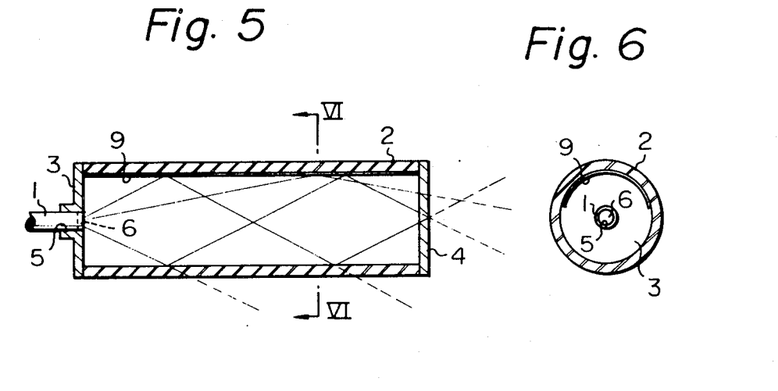
FIG. 6 is a cross sectional view taken along the line VI—VI in FIG. 5.

In an embodiment illustrated in FIGS. 5 and 6, a part of the inner periphery of the column 2 is an arcuate reflective surface 9, which can achieve the same object as that of the curved reflective surface 7' in FIG. 4.

Figures 7, 8:
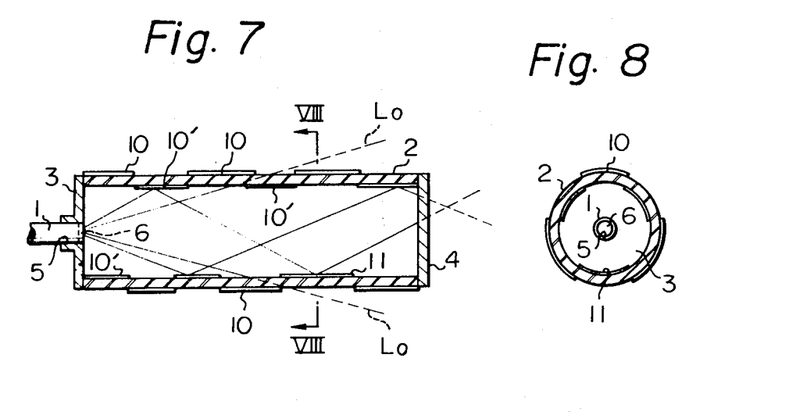
FIG. 7 is a longitudinal sectional view of still another embodiment of the present invention.
FIG. 8 is a cross sectional view taken along the line VIII—VIII in FIG. 7.

In an embodiment illustrated in FIGS. 7 and 8, the column 2 is transparent and is provided, on its outer and inner peripheries, with a plurality of peripherally spaced semi-transparent layers 10 and 10', respectively, which are located in a zigzag fashion or an alternative arrangement. That is, the semi-transparent layers 10 and 10' are not aligned with each other, when viewed in the radial directions of column 2. The device shown in FIGS. 7 and 8 can be advantageously used for a decorative illumination, because substantially no direct light ray reaches the eyes of a person, except for such light rays as designated by $L_0$ which pass between the outer and inner semi-transparent layers 10 and 10' and which are of a very little amount, and because the light rays emitting from the device present different brightnesses.

It is also possible to provide transparent end plates 3 and 4 either of which is (are) provided, on its (their) inner and outer peripheries, with outer and inner semi-transparent layers 10 and 10' in a zigzag arrangement, similar to FIG. 7.

It should be noted that different embodiments mentioned above can be properly combined.

Figure 9:
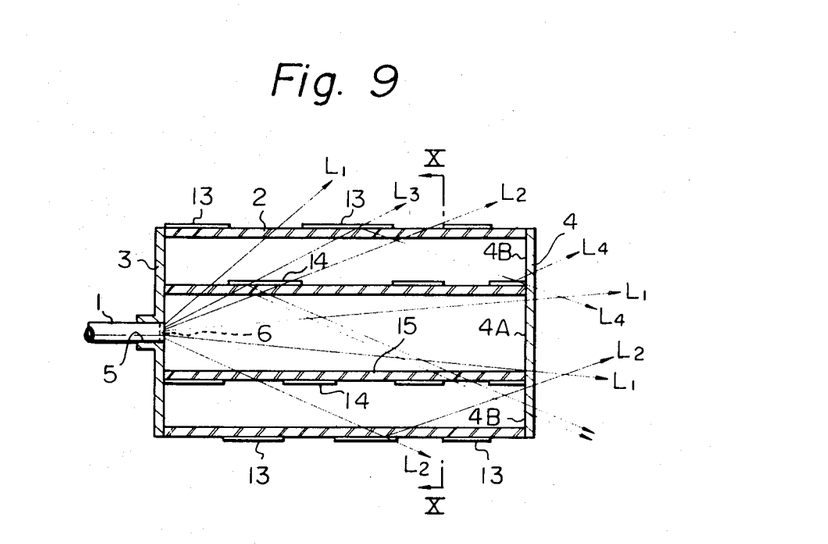
FIG. 9 is a longitudinal sectional view of still another embodiment of the present invention.

In another embodiment illustrated in FIGS. 9 and 10, column 2, which will be referred to as an outer column hereinafter and which is transparent, has therein an additional transparent inner column 15 coaxial thereto, so that a double tubular construction (column assembly) is provided. On the outer peripheries of the outer and inner columns 2 and 15 are provided a plurality of peripherally spaced semi-transparent members or layers 13 and 14, respectively, in a zigzag arrangement or in an alternative arrangement. That is, when viewed in radial directions of the columns, neither the outer semi-transparent layers 13 nor the inner semi-transparent layers 14 are located on the same radius. The second end plate 4 may be transparent, as illustrated in FIG. 9, or semi-transparent. When the second end plate 4 is transparent, the light rays along the optical paths $L_1$, which pass neither the outer semi-transparent layers 13 nor the inner semi-transparent layers 14, are brightest and the brightness decreases in the order of the optical paths $L_2$, $L_3$ and $L_4$ wherein, the optical paths $L_2$ pass only once one of the semi-transparent layers 13 and 14 without being reflected, the optical paths $L_3$ pass twice the semi-transparent layers or are reflected twice by the latter, and the optical paths $L_4$ pass three times the semi-transparent layers or are reflected three times by the latter. The increase in the number of passages or reflections of the light rays through or by the semi-transparent layers decreases the brightness of the light rays.

It is also possible to make the inner circular surface portion 4A of the second end plate 4, that is located in the circle corresponding to the inner column 15, transparent or semi-transparent and to make the annular shaped inner surface portion 4B of the second end plate 4, that is located around the surface portion 4A, semi-transparent or reflective. Alternatively, it is also possible to make the whole of the inner surface of the second end plate 4 reflective, which can provide different brightnesses of light rays in different directions. In order to further increase the difference in brightness between the emitted light rays, the inner surface of the first end plate 3 can be a reflective surface.

Figure 10:
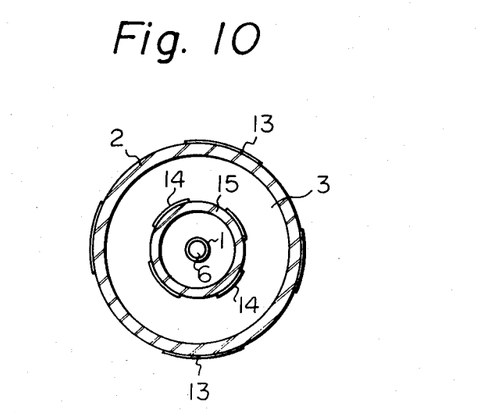
FIG. 10 in a cross sectional view taken along the line X—X in FIG. 9.
Figure 11:
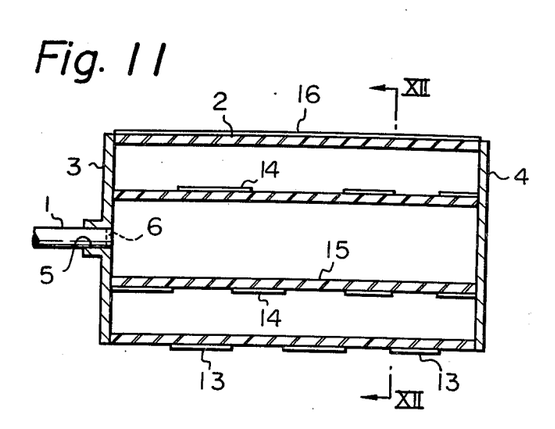
FIG. 11 shows a variant of FIG. 9.
Figure 12:
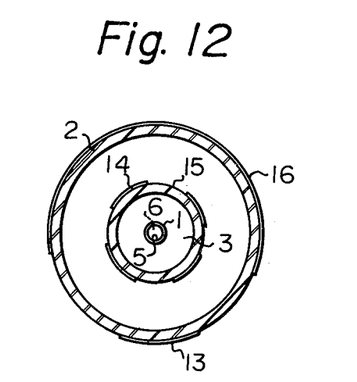
FIG. 12 is a cross sectional view taken along the line XII—XII in FIG. 11.

In FIGS. 11 and 12 which show a modification of FIGS. 9 and 10, some of the outer semi-transparent layers 13 are replaced by an arcuate reflective layer 16, which axially extends over the axial length of the outer column 2. The arcuate reflective layer 16 can be provided on a part of the outer periphery of the inner column 15, instead of the outer periphery of the outer column 2. The modification illustrated in FIGS. 11 and 12 can also achieve the object that light rays emitted from the device have different brightnesses.

It is also possible to provide transparent end plates 3 and 4 either of which is (are) provided, on its (their) inner and outer peripheries, with outer and inner semi-transparent layers 13 and 14 in a zigzag arrangement, similar to FIG. 9.

Figure 15:
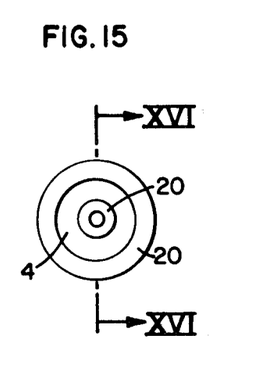
FIG. 15 is a side elevational view of an end plate of an alternate embodiment of the present invention.
Figure 16:
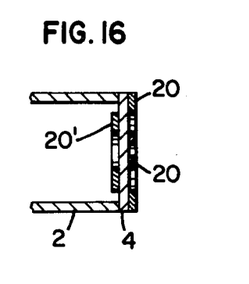
FIG. 16 is a partial cross-sectional view of the end plate of FIG. 15.

For example, in the embodiment illustrated in FIGS. 15 and 16, the end plate 4 is transparent and is provided, on its outer and inner peripheries, with a plurality of peripherally spaced semi-transparent layers 20 and 20', respectively, which are located in a zigzag fashion or an alternative arrangement. That is, the semi-transparent layers 20 and 20' are not aligned with each other, when viewed in the transverse direction of column 2. The device shown in FIGS. 15 and 16 can be advantageously used for a decorative illumination, because substantially no direct light ray reaches the eyes of a person, except for such light rays which pass between the outer and inner semi-transparent layers 20 and 20' which are of a very little amount, and because the light rays emitting from the device present different brightnesses.

Figure 13:
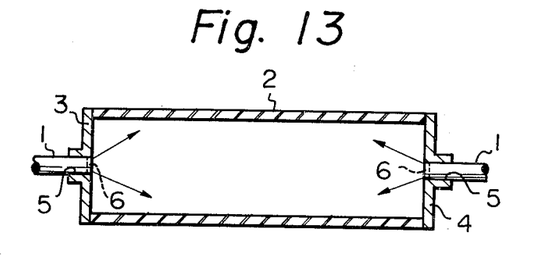
FIG. 13 is a longitudinal sectional view of another embodiment which includes two opposed end plates with optical fibers.

Finally, it is also possible to provide the second end plate 4 with a guide hole 5 in which the optical fiber 1 is inserted. That is, the beams of light rays are emitted into a column 2 or 15 from the two symmetrically opposed optical fibers 1 which are connected to a common or separate light source(s), as shown in FIG. 13.

It should be noted that different embodiments mentioned above, or their modifications or variants, can be properly combined.

As can be understood from the above discussion, according to the present invention, light rays (e.g sun beams) propagating through an optical conductor, such as an optical fiber, can be effectively diffused so that an extended area can be illuminated with soft or mellow light. Furthermore, according to the present invention, the light from the optical conductor is diffused into a closed container defined by the column(s) and the end plates, the decrease of the optical performance of the device and the generation of heat due to dust or foreign substances, which would otherwise come in to the container, can be prevented. In addition, it is also possible to prevent the reflective surfaces or layers from being oxidized by filling the container with inert gas, such as nitrogen gas.

I claim:

1. An optical lighting device for diffusing beams of light rays propagating through and emitting from an optical conductor connected to a light source, comprising: a semi-transparent hollow column, a first end plate which is connected to one end of the hollow column to close the same and which has a guide hole in which an outlet end of the optical conductor is to be fitted, and a second end plate which is connected to the other end of the hollow column to close the same; wherein said second end plate is semi-transparent at its center portion and has a reflective inner surface around the semi-transparent center portion.

2. An optical lighting device according to claim 1, wherein said column is a hollow cylinder.

3. An optical lighting device according to claim 1, wherein said column is a hollow cone.

4. An optical lighting device according to claim 1, wherein said second end plate is transparent at its center portion and has a reflective inner surface around the transparent center portion.

5. An optical lighting device according to claims 2, 3 or 4, wherein said first end plate has a reflective inner surface.

6. An optical lighting device according to claim 1, wherein said second end plate includes a reflective inner surface at its center portion.

7. An optical lighting device according to claim 1, wherein said first end plate has a reflective inner surface.

8. An optical lighting device according to claim 6 or 7, wherein said reflective inner surface is a flat surface.

9. An optical lighting device according to claim 6 or 7, wherein said reflective inner surface is a curved surface.

10. An optical lighting device according to claim 1, wherein said second end plate has a guide hole in which an outlet end of an additional optical conductor is to be fitted.

11. An optical lighting device according to claim 1, wherein said hollow column has an inner surface which is in part a reflective surface.

12. An optical lighting device for diffusing beams of light rays propagating through and emitting from an optical conductor connected to a light source, comprising: a semi-transparent hollow column, a first end plate which is connected to one end of the hollow column to close the same and which has a guide hole in which an outlet end of the optical conductor is to be fitted, and a second end plate which is connected to the other end of the hollow column to close the same; and said first end plate is provided, on its outer and inner surfaces, with a plurality of angularly spaced outer and inner reflective layers which are located in an alternative arrangement when viewed in axial directions of the column.

13. An optical lighting device for diffusing beams of light rays propagating through and emitting from an optical conductor connected to a light source, comprising: a semi-transparent hollow column, a first end plate which is connected to one end of the hollow column to close the same and which has a guide hole in which an outlet end of the optical conductor is to be fitted, and a second end plate which is connected to the other end of the hollow column to close the same; and said second end plate is provided, on its outer and inner surfaces, with a plurality of angularly spaced outer and inner reflective layers which are located in an alternative arrangement when viewed in axial directions of the column.

14. An optical lighting device for diffusing beams of light rays propagating through and emitting from an optical conductor connected to a light source, comprising: a semi-transparent hollow column, a first end plate which is connected to one end of the hollow column to close the same and which has a guide hole in which an outlet end of the optical conductor is to be fitted, and a second end plate which is connected to the other end of the hollow column to close the same; and said column is provided, on its outer and inner peripheries, with a plurality of peripherally spaced outer and inner reflective layers which are located in an alternative arrangement when viewed in radial directions of the column.

15. An optical lighting device for diffusing beams of light rays propagating through and emitting from an optical conductor connected to a light source, comprising: a hollow column assembly consisting of inner and outer transparent hollow columns, a first end plate which is connected to one end of the hollow column assembly to close the same and which has a guide hole in which an outlet end of the optical conductor is fitted, and a second end plate which is connected to the other end of the hollow column assembly to close the same, said outer and inner hollow columns being provided, on their peripheries, with a plurality of pheripherally spaced outer and inner semi-transparent layers which are located in a zigzag arrangement in which the outer and inner semi-transparent layers are not located in the same radius when viewed in radial directions of the column assembly.

16. An optical lighting device according to claim 15, wherein said second end plate is transparent.

17. An optical lighting device according to claim 15, wherein said second end plate is semi-transparent.

18. An optical lighting device according to claim 15, wherein said second end plate has a reflective inner surface.

19. An optical lighting device according to claim 15, wherein said second end plate comprises a transparent center circular portion which closes the inner hollow column and a semi-transparent annular portion which is located around the center circular portion to close the outer hollow column.

20. An optical lighting device according to claim 15, wherein said second end plate comprises a semi-transparent center circular portion which closes the inner hollow column and a reflective annular portion which is located around the center circuit portion to close the outer hollow column.

21. An optical lighting device according to any one of the preceding claims 15-20, wherein said first end plate has a reflective inner surface.

22. An optical lighting device according to claim 15, wherein said second end plate has a guide hole in which an outlet end of an additional optical conductor is to be fitted.

23. An optical lighting device according to claim 15, wherein said inner hollow column has a peripheral surface which is in part a reflective surface.

24. An optical lighting device according to claim 15, wherin said outer hollow column has a peripheral surface which is in part a reflective surface.

25. An optical lighting device according to claim 15, wherein said first end plate is provided, on its outer and inner surfaces, with a plurality of angularly spaced outer and inner reflective layers which are located in an alternative arrangement when viewed in axial directions of the column assembly.

26. An optical lighting device according to claim 15, wherein said second end plate is provided, on its outer and inner surfaces, with a plurality of angularly spaced outer and inner reflective layers which are located in an alternative arrangement when viewed in axial directions of the column assembly.

* * * * *

UNITED STATES PATENT AND TRADEMARK OFFICE
CERTIFICATE OF CORRECTION

PATENT NO. : 4,459,642

DATED : July 10, 1984

INVENTOR(S) : Kei Mori

It is certified that error appears in the above-identified patent and that said Letters Patent is hereby corrected as shown below:

Column 2, line 12, delete "and";

Column 2, line 14 "." should be --;--;

Column 2, line 16, after "invention;" insert --and--;

Column 2, line 65, "party" should be --partly--;

Column 6, line 43, "pheripherally" should be --peripherally--;

Column 7, line 12, "wherin" should be --wherein--.

Signed and Sealed this

Fifteenth Day of January 1985

[SEAL]

Attest:

GERALD J. MOSSINGHOFF

Attesting Officer

Commissioner of Patents and Trademarks